US006999113B1

(12) United States Patent
Omura

(10) Patent No.: US 6,999,113 B1
(45) Date of Patent: Feb. 14, 2006

(54) PORTABLE PRINTER AND CAMERA

(75) Inventor: Hiroshi Omura, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/425,617

(22) Filed: Oct. 22, 1999

(30) Foreign Application Priority Data

Oct. 22, 1998 (JP) ............................... 10-300978
Oct. 14, 1999 (JP) ............................... 11-292642

(51) Int. Cl.
*H04N 5/225* (2006.01)
*G06K 1/00* (2006.01)

(52) U.S. Cl. ..................... 348/207.2; 348/375; 358/1.2

(58) Field of Classification Search ............. 348/207.2, 348/207.99, 333.01, 333.02, 333.12, 373, 348/220-1, 586, 591, 231.9, 375; 396/429; 382/173, 358, 464; 358/1.2
See application file for complete search history.

(56) References Cited

U.S. PATENT DOCUMENTS

| 5,715,234 | A | * | 2/1998 | Stephenson et al. | ........ 396/429 |
| 5,781,665 | A | * | 7/1998 | Cullen et al. | ................ 382/254 |
| 5,847,836 | A | * | 12/1998 | Suzuki | ........................ 358/296 |
| 5,867,738 | A | * | 2/1999 | Oka et al. | ....................... 396/2 |
| 5,907,315 | A | * | 5/1999 | Vlahos et al. | ............... 382/167 |
| 5,917,548 | A | * | 6/1999 | McIntyre | ............... 348/333.06 |
| 5,923,380 | A | * | 7/1999 | Yang et al. | .................. 348/586 |
| 5,946,031 | A | * | 8/1999 | Douglas | ................. 348/207.99 |
| 6,191,815 | B1 | * | 2/2001 | McIntyre | .................. 348/220.1 |
| 6,445,417 | B1 | * | 9/2002 | Yoshida et al. | ............. 348/374 |
| 6,476,863 | B1 | * | 11/2002 | Silverbrook | ............. 348/231.9 |
| 6,507,361 | B1 | * | 1/2003 | Barber | ..................... 348/207.2 |
| 2001/0010549 | A1 | * | 8/2001 | Miyake | ....................... 348/232 |

FOREIGN PATENT DOCUMENTS

| JP | 07303250 | * 11/1995 |
| JP | 8-122944 | 5/1996 |
| JP | 9-138471 | 5/1997 |

* cited by examiner

Primary Examiner—David L. Ometz
Assistant Examiner—Lin Ye
(74) Attorney, Agent, or Firm—Sughrue Mion, PLLC

(57) ABSTRACT

When an image frame and the kind of ID photograph to make are selected by operating a console, a system controller discriminates a human subject of the image frame from its background, and process image data of the image frame according to the selected kind of ID photograph by deleting any other subject contained in the background and changing the size and position of the human subject such that the human subject is printed on an instant film in a size at a position designated for the selected kind of ID photograph. In accordance with the image data processed by the system controller, an LCD unit is driven to display an image containing the human subject with a blanked background. The image displayed on the LCD unit is observed through a monitoring screen. Upon a printing command, the image displayed on the LCD unit is projected onto the instant film to print that image on the instant film.

9 Claims, 14 Drawing Sheets

PORTABLE PRINTER AND CAMERA

BACKGROUND OF THE INVENTION

1. Field of the Invention

The present invention relates to a portable printer and a camera, particularly to a portable instant printer and an electronic still camera having an instant printer incorporated thereinto, that have an image processing function for making ID photographs.

2. Background Arts

Generally, certificates and licenses, such as a driving license and a passport, need to be attached a photograph of the granted person for identification. Hereinafter, such a photograph will be referred to as an ID photograph. The ID photograph is standardized in format and layout for each kind. As for passports, the ID photograph is determined to bear the head and the shoulder of the granted person in a full face wearing no hut and no color glasses, and may not include any subject in the background. As shown in FIG. 14, the length A and the width B of the ID photograph for passport is 4.5 cm and 3.5 cm respectively, wherein the length C from the crown to the chin must be 27 mm±2 mm, the length D from the left margin to the center of the face must be 17 mm±2 mm, and the length E from the top margin to the crown must be 7 mm±2 mm. As for driving license, the ID photograph is determined to be 3.0 cm×2.4 cm, contain the upper one third of the licensee wearing no hut and no color glasses, and may not include any subject in the background. To adjust to these standards, the ID photographs are usually taken by professional photographers or by an automatic ID photograph taking machine.

Meanwhile, many types of digital color printers have been known in the art, that print a full-color image on a recording medium on the basis of digital image data obtained through an electronic imaging device, such as a video camera, a digital still camera or the like, from a subject or a full-color original, e.g. a negative or positive image recorded on photographic film or paper. It is also known in the art to read out image data from a memory medium, such as a card memory, and process it so as to print out a hard copy of a processed or synthesized image.

A portable instant printer that uses an instant film sheet as a recording medium has also been known in the art. The instant printer exposes the instant film sheet by projecting three color light beams from a recording head that is driven by digital image data. Also, an electronic still camera having such an instant printer incorporated therein, hereinafter referred to as a digital instant camera, has been developed to produce a photograph instantly after it is taken by the electronic still camera.

It is possible to take the ID photograph by the digital instant camera, but the photographer must adjust the subject to the standards of the ID photograph, in the same way as the conventional camera. It is also possible to produce the ID photograph by use of a digital printer on the basis of image data obtained through some imaging electronic imaging device. However, the image data must be previously processed to adjust the picture to the standards of the ID photograph to make, by use of a personal computer or the like installed with an image processing program, and it has been difficult to process the image data so as to adjust to the ID photograph standards on the personal computer.

There are printers and electronic still cameras that have an image processing function. However, the conventional image processing function is just for synthesizing an ornamental framing image with a photographed image or for merging a caption or the like in the photographed image. It has conventionally been impossible to make or take the standardized ID photographs even with the digital printer or still camera having the image processing function.

SUMMARY OF THE INVENTION

In view of the foregoing, an object of the present invention is to provide a printer and a camera which produce the standardized ID photographs from a human subject with some other subjects in the background, or from image data of a portrait photograph that is not adjusted to the standards for the ID photograph.

To achieve the above object, the present invention provides a printer having a printing device for printing an image on a recording medium, a driving device for driving the printing device based on digital image data, and an image processing device. The image processing device extracts image data pieces representative of a human subject from image data of an image frame, and processes the image data pieces of the human subject such that the human subject is printed on the recording medium in a designated size at a designated position. The image processing device also replaces other image data pieces than those of the human subject with blanking data to delete any other subject contained in the image frame. By driving the printing device in accordance with image data processed by the image processing device, the human subject is printed onto the recording medium in the designated size at the designated position with a blanked background.

It is preferable to provide the printer with a mode selection device for selecting a normal mode for driving the printing device on the basis of the image data of the image frame to print a picture frame corresponding to the image frame, or a second mode for driving the printing device on the basis of the image data processed by the image processing device to print a picture frame containing the human subject with the blanked background.

According to a preferred embodiment, the printer is provided with a selection device for selecting a kind of ID photograph from among predetermined options, and the size and position of the human subject and a picture frame size are automatically designated by the selected kind of ID photograph. Thereby, the operator can make an appropriate kind of ID photograph just by designating the kind of ID photograph.

By combining the printer with an electronic imaging device, such as an electronic still camera, for obtaining digital image data from a subject, it comes to be possible to take and print out an ID photograph anytime and anywhere.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limiting the present invention, wherein like reference numerals designate like or corresponding parts throughout the several views, and wherein.

DETAILED DESCRIPTION OF THE PREFERRED EMBODIMENT

Figure 1:
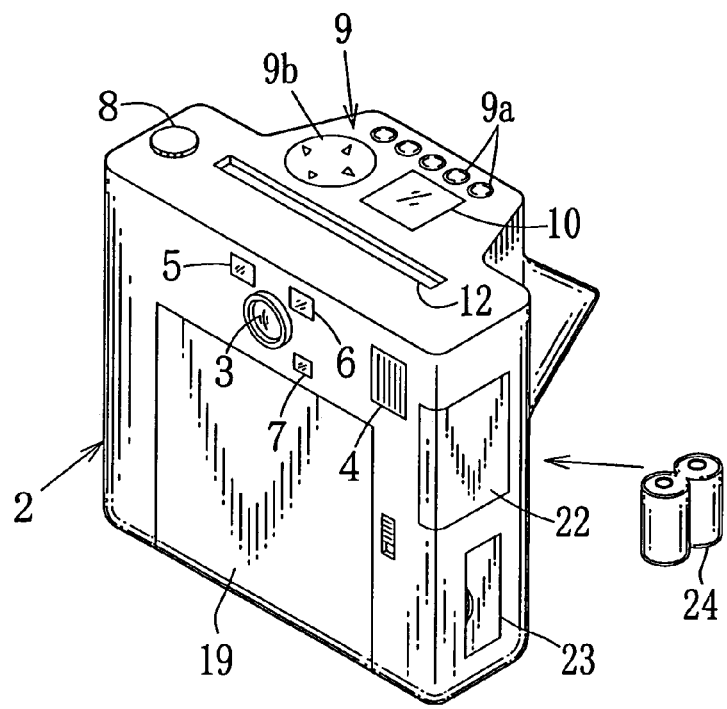
FIG. 1 is a front perspective view of a portable instant printer having an electronic imaging device incorporated thereinto, so that it doubles as a digital instant camera, according to an embodiment of the invention.
Figure 2:
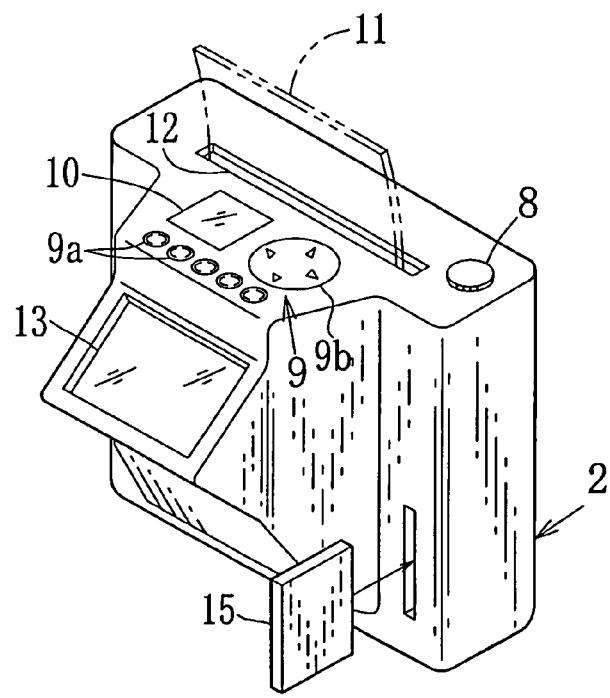
FIG. 2 is a rear perspective view of the portable instant printer of FIG. 1.

In FIGS. 1 and 2, a portable instant printer 2 has on its front side a photographic lens 3, a flash projector 4 of a flash device, light projecting and receiving windows 5 and 6 of an AF (auto focusing) device, and a photometric window 7. On a top side of the portable instant printer 2, there are a release button 8, a console 9 for entering data or commands, a data display panel 10, and a film exit 12 for ejecting an instant film 11 after exposure. A monitoring screen 13 is provided on a rear side of the portable instant printer 2. The monitoring screen 13 functions as an electronic viewfinder that displays a photographic field covered by the photographic lens 3 in a real time fashion in a photography mode. The monitoring screen 13 is also used for displaying a still image in a display mode or a printing mode, as set forth in detail later.

Figure 3:
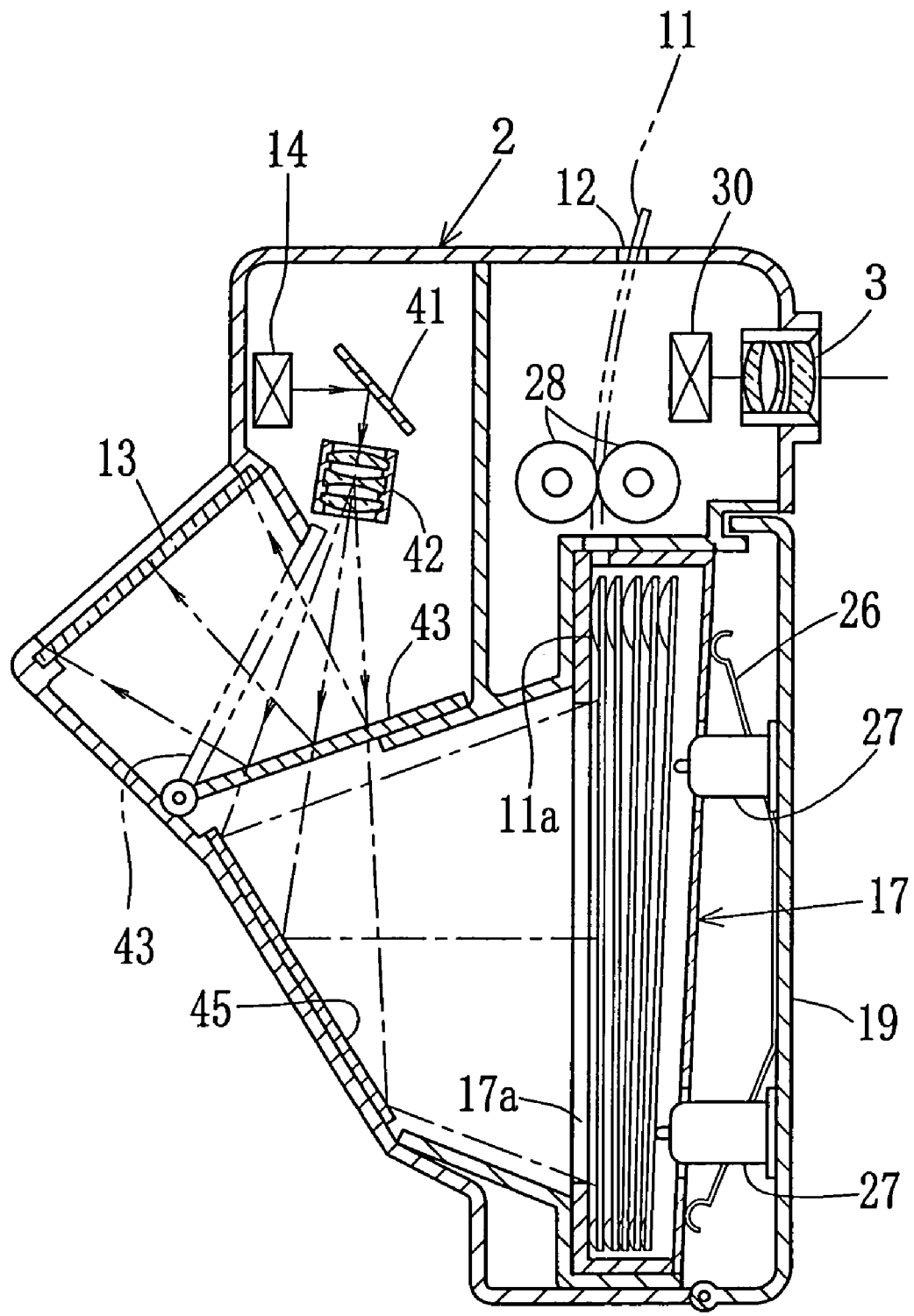
FIG. 3 is a sectional view of the portable instant printer of FIG. 1.

As shown in FIG. 3, a CCD image sensor 30 combined with a matrix of micro color filters for red, green and blue is placed on an image plane of the photographic lens 3, to convert the optical image formed through the photographic lens 3 into electronic three color image signals. Instead of the CCD image sensor 30, a MOS type image sensor or another type image sensor may be usable. In the photography mode, the CCD image sensor 30 is continuously activated, and an LCD unit 14 displays the same full-color image as formed on the CCD image sensor 30 on the basis of the electronic color image signal in a real time fashion. The image displayed on the LCD unit 14 is visible through the monitoring screen 13.

The instant film 11 may be one of those widely used in conventional instant cameras. An instant film pack 17 containing a pile of instant films 11 therein is loaded in the portable instant printer 2, such that its exposure aperture 17a is oriented rearward of the portable instant printer 2. To load or exchange the instant film pack 17, a pack loading lid 19 is provided on the front side of the portable instant printer 2 below the photographic lens 3. The lid 19 has a pack pressing spring 26 on its inner wall, for pressing the instant film pack 17 rearward and thus fix the position of the instant film pack 17 in the portable instant printer 2. Film pressing members 27 are also provided on the inner wall of the pack loading lid 19. The film pressing members 27 are inserted into the film pack 17 through openings formed through the film pack 17 on opposite side from the exposure aperture 17a, for urging the instant films 11 toward the exposure aperture 17a. Thereby, an exposure surface of the instant film 11 that is exposed through the exposure aperture 17a is correctly positioned.

A battery chamber lid 22 and a terminal cover 23 are provided on one side of the portable instant printer 2. The battery chamber lid 22 is opened to load or unload a battery back 24 that constitutes a power source of the portable instant printer 2. By opening the terminal cover 23, data I/O terminals 25 (see FIG. 4) are exposed, through which the portable instant printer 2 may be connected to some external apparatuses for exchanging image data from each other. It is also possible to power the portable instant printer 2 from the net through an AC adapter or the like.

When the release button 8 is pressed halfway in the photography mode, near-infrared light beams are projected from the light projecting window 5 toward the subject, and then reflected from the subject. The reflected light is received by a position sensitive device that is not shown but located behind the light receiving window 6, to measure the distance to the subject. Simultaneously, subject brightness is measured through a photo-transistor that is not shown but located behind the photometric window 7.

When the release button 8 is fully pressed, the photographic lens 3 is focused on the subject according to the measured subject distance. Upon the full depression of the release button 8, a flash light is projected from the flash projector 4 toward the subject if the subject brightness is below a predetermined level in an auto-flash mode. The three color image signal obtained from the CCD image sensor 30 at the moment the release button 8 is fully depressed, is written on a removable card memory 15 or an internal memory 16 (see FIG. 4) of the portable instant printer 2, after being converted into digital three color image data.

The console 9 includes a plurality of setting buttons 9a and a cursor button 9b. By operating these buttons 9a and 9b, the portable instant printer 2 is set to one of the photography mode, the display mode for displaying a still image frame on the LCD unit 14 on the basis of the image data written on the card memory 15 or the internal memory 16, and the printing mode for printing the displayed still image frame onto the instant film 11. In the photography mode, the console 9 is used for deciding whether the image data is to be written on the card memory 15 or the internal memory 16. By operating the console 9 in the photography mode, it is also possible to switch over the auto-flash mode either to a flash-on mode or to a flash-off mode, wherein a flash light is projected or not projected regardless of the subject brightness respectively. Besides, the console 9 is used for setting or resetting a self-timer mode, a successive exposure mode, and other photographic modes. In the display mode, the console 9 is used for deciding whether the image data is to be read out from the card memory 15 or the internal memory 16, for designating the frame number of the still image frame to display, or for setting and resetting a successive frame display mode for displaying a series of frames successively.

In the printing mode, the console 9 is used for selecting an image frame to print, for entering a print command, as well as for selecting an ID photograph making mode. The console 9 is also operated for processing the image data in the display mode and the printing mode, as set forth in detail later. What is set through the console 9 is displayed on the data display panel 10.

When the print command is entered, the still image displayed on the LCD unit 14 is projected onto the exposure surface of the instant film 11 positioned behind the exposure aperture 17a of the instant film pack 17. As a result, the displayed still image is recorded as a latent image on a photosensitive layer of the instant film 11.

The exposed instant film 11 is ejected out of the portable instant printer 2 through the film exit 12. To eject the exposed instant film 11, a pair of developing rollers 28, a not-shown rake member and a developing motor 72 (see FIG. 4) for activating the developing rollers 28 and the rake member are provided in the portable instant printer 2. The rake member is engaged with the bottom edge of the exposed instant film 11 and pushes it out of the instant film pack 17 through a slit formed in a top wall of the instant film pack 17. Then, the top end of the instant film 11 is inserted into between the developing rollers 28. Thereafter, the instant film 11 is fed out by the developing rollers 28. As the instant film 11 squeezes through the developing rollers 28, a developing solution pod 11a of the instant film 11 is crushed, and the developing solution is equally spread over the instant film 11 in between the photosensitive layer and an image forming layer. In a few minutes, the recorded latent image is developed, transferred to the image forming layer, and appears as a positive image in an image exhibit area on the opposite side from the exposure surface. Since the instant film 11 has a determined size, the number of rotation necessary for each developing operation as above is predetermined. So the developing motor 72 automatically stops after rotating the predetermined number.

According to this embodiment, the image exhibit area is equal in size to a recording area defined by the exposure aperture 17a. The image exhibit area is about 70 mm in the direction to eject the instant film, and about 90 mm in the direction orthogonal to the film ejecting direction. Therefore, it is possible to produce four ID photographs for the passport from a sheet of instant film 11 by recording four multiplied frames arranged in a 2×2 matrix.

Figure 5:
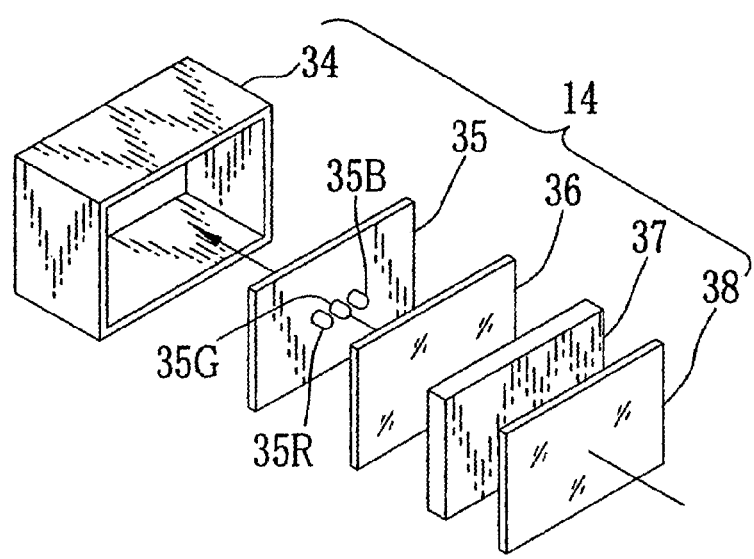
FIG. 5 is an exploded perspective view of an LCD unit of the portable instant printer.
Figure 6:
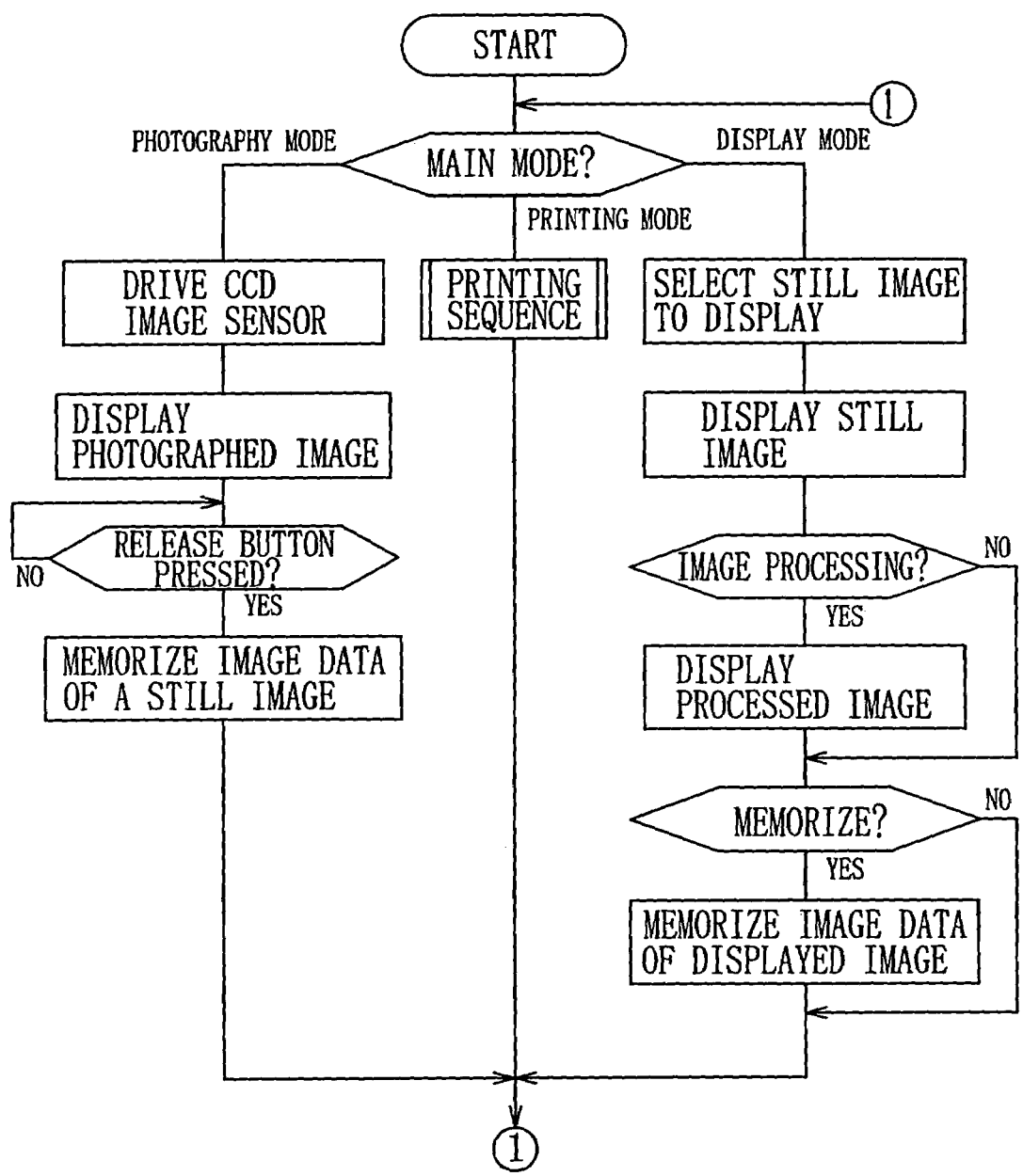
FIG. 6 shows a flow chart illustrating the overall operation of the portable instant printer.
Figure 7:
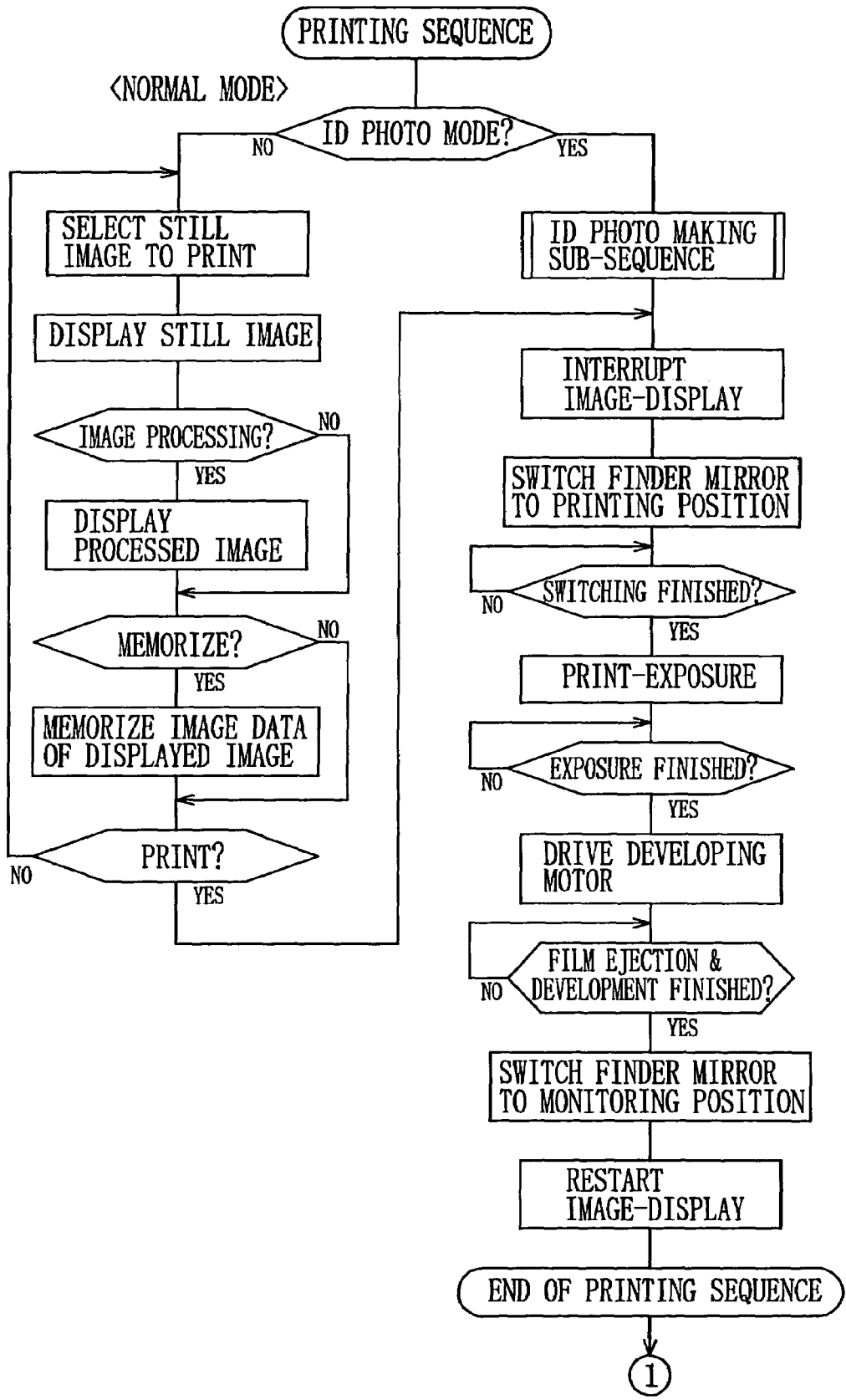
FIG. 7 shows a flow chart illustrating a printing sequence for the portable instant printer.

As shown in FIG. 5, the LCD unit 14 is constituted of a circuit board 35, a diffusion plate 36, an LCD panel 37, and a transparent protection glass 38, which are mounted in a rectangular-barrel-shaped housing 34 in this order from a rear side of the LCD unit 14. A red light emission diode 35R, a green light emission diode 35G and a blue light emission diode 35B are mounted on a center area of the circuit board 35, to illuminate the LCD panel 37 from the rear side.

The LCD panel 37 is 4.5 mm×3.5 mm in size, and consists of a large number of liquid crystal dot segments arranged in a two-dimensional matrix. Unlike the conventional LCD color display panel, color micro filters are not attached to the dot segments. The dot segments are individually driven at a high speed by an active driving method. For example, "Cyber Display" (a trade name) produced by Kopin Co. U.S.A., is preferably used as the LCD panel 37.

The diffusion plate 36 diffuses the light beams from the three color light emission diodes 35R, 35G and 35B, thereby to illuminate the rear side of the LCD panel 37 equivalently. For example, the diffusion plate 36 is made of an opalescent plastic plate, or a plastic plate composed of a transparent acrylic resin mixed with a large number of micro beads having a high light-diffusing property.

The circuit board 35 is electrically connected to a display driving circuit 40 (see FIG. 4) through an opening formed in the rear side of the housing 34, and also to the LCD panel 37 through a not-shown flexible printed circuit board. In accordance with a drive signal and a trigger signal from the display driving circuit 40, the LCD panel 37 and the light emission diodes 35R, 35G and 35B are driven synchronously with each other.

Specifically, on the basis of each color image signal, the display driving circuit 40 generates a drive signal representative of a density distribution pattern of a corresponding color frame, and outputs the drive signal to the LCD panel 37. Thereby, each individual liquid crystal dot segment is driven to have a transmittance density equivalent to a density of a corresponding pixel of that color frame. The drive signal is supplied to the LCD panel 37 one color after another in a cyclic fashion.

Synchronously with the driving cycle of the LCD panel 37 for each color, the light emission diodes 35R, 35G and 35B are driven one after another for a predetermined time by the trigger signal. That is, while the LCD panel 37 is driven in accordance with the red color image signal, the red light emission diode 35R is turned on, thereby to display the red frame on the LCD unit 14. While the LCD panel 37 is driven in accordance with the green color image signal or the blue color image signal, the green light emission diode 35G or the blue light emission diode 35B is turned on to display the green frame or the blue frame on the LCD unit 14 respectively. In this way, the three color frames are displayed repeatedly in a time sequential fashion from each other. By repeating the time sequential display of the three color frames in a short cycle, the LCD unit 14 seems to display a full-color image because of the after image effect of eyes.

According to this LCD unit 14, all of the liquid crystal dot segments of the LCD panel 37 are used as pixels of each color frame, so the pixel density of each color frame is remarkably higher than the conventional color LCD panel wherein micro color filers of three colors are arranged in a matrix in front of the respective dot segments. Furthermore, since the light emission diodes 35R, 35G and 35B consume less electric power as compared to fluorescent lamps that are used in the conventional LCD panel, it comes to be possible to power the portable instant printer 2 for a longer time by use of the built-in battery pack 24 only. This contributes to improving portability of the portable instant printer 2.

Luminance of the image displayed on the LCD unit 14 may be adjusted by controlling time of driving the light emission diodes 35R, 35G and 35B, or current values for driving these diodes 35R, 35G and 35B. Since light emission diodes of different colors usually have different emission efficiencies, i.e. luminance per drive current, the driving time and the driving current for each light emission diode may be controlled to adjust color balance. It is also possible to correct the transmittance density of the liquid crystal dot segments in accordance with the difference in the emission efficiency between the different color light emission diodes 35R, 35G and 35B.

Since the screen size of the LCD panel 37 is too small, i.e. 4.5 mm×3.5 mm in this instance, to observe the displayed image directly, or to use the displayed image directly for exposing the instant film 11, the image displayed on the LCD unit 14 is enlarged through a lens unit 42 when projected onto the monitoring screen 13 or the instant film 11, as shown in FIG. 3. In this embodiment, since the LCD panel 37 is 4.5 mm×3.5 mm, whereas the exposure aperture 17a and thus the image exhibit area of the instant film 11 is 90 mm×70 mm, the image on the LCD panel 37 is enlarged to be 20 times as projected onto the instant film 11.

The image displayed on the LCD panel 37 is deflected by a mirror 41 downward to the lens unit 42. A movable finder mirror 43 is mounted below the lens unit 42 so as to be switchable between a monitoring position shown by solid lines and a printing position shown by phantom lines. The movable finder mirror 43 is switched over by a mirror switching solenoid 44 (see FIG. 4). The movable finder mirror 43 also functions as a light-shielding member for shielding the instant film 11 from extraneous light that enters through the monitoring screen 13.

Where the movable finder mirror 43 is in the monitoring position, the optical image enlarged through the lens unit 42 is deflected by the movable finder mirror 43 toward the monitoring screen 13. The monitoring screen 13 is made of a glass or plastic plate having a matt surface. Since the image displayed on the LCD unit 14 is reflected twice by the mirror 41 and the movable finder mirror 43, the image displayed on the monitoring screen 13 is directly similar to the image displayed on the LCD unit 14.

Where the movable finder mirror 43 is in the printing position, the movable finder mirror 43 is out of an optical path of the lens unit 42, so the image displayed on the LCD unit 14 is projected onto the exposure surface of the instant film 11 through the mirror 41, the lens unit 42 and a printing mirror 45 that is fixedly disposed below the movable finder mirror 43. Since the image displayed on the LCD unit 14 is reflected twice by the mirror 41 and the printing mirror 45, and the image recorded on the instant film 11 is observed from the opposite side from the exposure surface, the recorded image is directly similar to the image displayed on the LCD unit 14.

Figure 4:
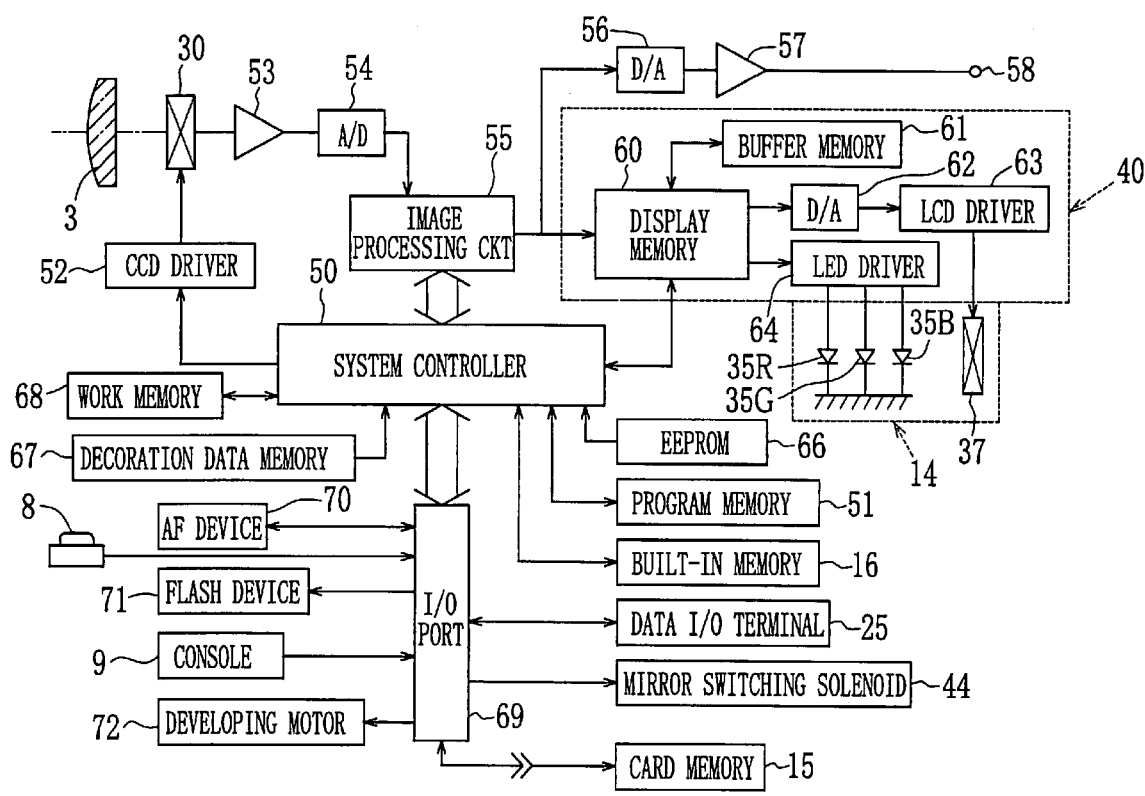
FIG. 4 is a block diagram showing the circuitry of the portable instant printer of FIG. 1.

Referring to FIG. 4 showing the circuitry of the portable instant printer 2, a system controller 50, which is constituted of a micro computer, sequentially controls allover operations of the portable instant printer 2, including image processing of the three color image data, in response to input signals entered through the release button 8 and the console 9. Various sequence programs executed by the system controller 50 are written in a program memory 51.

In the photography mode, the system controller 50 drives the CCD image sensor 30 through a CCD driver 52, and the electronic color image signal obtained through the CCD image sensor 30 is serially amplified by an amplifier 53 and then converted into the digital three color image data by an A/D converter 54.

The digital three color image data is subjected to conventional image processing operations, such as a matrix operation, a white balance adjustment and a gamma correction, in an image processing circuit 55. The image processing circuit 55 outputs the image data to a display controller 60 included in the display driving circuit 40. The display driving circuit 40 further includes a buffer memory 61, a D/A converter 62, an LCD driver 63, and an LED driver 64. The display controller 60 writes the image data of one frame on the buffer memory 61 separately for each color.

Thereafter, the display controller 60 reads out the image data of one color after another from the buffer memory 61, and send it to the LCD driver 63 through the D/A converter 62 at predetermined intervals. Thereby, the LCD panel 37 sequentially displays the red, green and blue image frames. Synchronously with the switching intervals between the three color image frames on the LCD panel 37, the LED driver 64 receives the switching signal for switching between the light emission diodes 35R, 35G and 35B, so the light emission diodes 35R, 35G and 35B are driven in turns.

The three color image data of one frame written on the buffer memory 61 is replaced by three color image data of another frame, each time the image processing circuit 55 outputs three color image data of one frame.

An output terminal 58 is connected to the image processing circuit 55 through a D/A converter 56 and an amplifier 57, so that a NTSC composite signal may be produced from the image data output from the image processing circuit 55. The NTSC is sent through the output terminal 58 to a home TV monitor, so the home TV monitor can display a full-color image photographed by the CCD image sensor 30 through the photographic lens 3 in a real time fashion.

An EEPROM 66 stores various kinds of correction data and control data, and the system controller 50 reads out the correction data or the control data at appropriate times for operating the portable instant printer 2 according to the sequence program. The built-in memory 16 can store the full color image data of fifty frames at the maximum. After the built-in memory 16 stores data to the full, it is possible to write new data on the built-in memory 16 by deleting previously written image data or transferring it to the card memory 15 or another external memory connected to the data I/O terminals 25. A decoration data memory 67 stores decoration data for modifying the shape of contour of the printed picture, or for merging a decorative framing pattern around the picture. The decoration data memory 67 may previously store other kind of decoration data for merge-printing captions, messages, marks or illustrations on the picture. The decoration data memory 67 is readable in the display mode and the printing mode. A work memory 68 is used by the system controller 50, for processing image data in the display mode and the printing mode, in order to produce an ID photograph, synthesize the decoration data with the image data, or to change the quality of the image, such as edge enhancement or color balance modification.

The system controller 50 monitors input signals from the console 9 through an I/O port 69, and controls the AF device 70, the flash device 71 and the developing motor 72 in accordance with the input signals. The system controller 50 accesses the card memory 15 and the data I/O terminals 25 through the I/O port 69, to exchange image data. The system controller 50 sends the image data read out from the built-in memory 16 or the card memory 15 to the display controller 60, so that an image is displayed on the LCD unit 14 on the basis of the image data. The system controller 50 also reads out image data from the work memory 68, and sends it to the display controller 60. Therefore, the image processed for the ID photograph or the image synthesized with the decorative frame or the like is observed through the monitoring screen 13, and thus it is possible to print that image on the instant film 11.

The operation of the portable instant printer 2 having the above described construction will now be described with reference to FIGS. 6 to 9.

When a not-shown power switch is turned on, the system controller 50 sets the portable instant printer 2 to one of the photography mode, the display mode and the printing mode in accordance with the input signal from the console 9. Thereafter, the portable instant printer 2 may be switched over between these three main modes at appropriate times by operating the console 9.

In the photography mode, the electronic image signal is serially obtained through the CCD image sensor 30, and converted into the three color image data. The image data is sent to the display driving circuit 40 through the image processing circuit 55. So the LCD unit 14 displays a full-color image of a subject placed in the photographic field of the photographic lens 3 in a real time fashion, while the image displayed on the LCD unit 14 is projected toward the monitoring screen 13 through the mirror 41, the lens unit 42 and the movable finder mirror 43.

Upon a half depression of the release button 8, the AF device 70 is activated to measure the subject distance through the light projecting and receiving windows 5 and 6. Also, the subject brightness is measured through the photometric window 7. Upon a full depression of the release button 8, the photographic lens 3 is focused on the subject, and the image data of one full-color image frame that is obtained at that moment is transferred from the image processing circuit 55 to the system controller 50. Then the system controller 50 writes the image data of the full-color image frame on the built-in memory 16, or the card memory 15 according to the command entered through the console 9.

In the display mode, the system controller 50 reads out three color image data of a still image to display from a designated one of the card memory 15, the built-in memory 16, and the external memory connected to the data I/O terminals 25. When the successive frame display mode is selected, a series of frames read out from the designated memory are displayed successively on the LCD unit 14. Or an individual frame designated individually through the console 9 is displayed on the LCD unit 14. The three color image data is sent to the display controller 60, and is written on the buffer memory 61. Then, the display driving circuit 40 drives the LCD unit 14 on the basis of the three color image data written in the buffer memory 61 in the same way as in the photography mode, so the LCD unit 14 displays a still full-color image.

If an image processing command is entered through the console 9, the image data of the displayed image frame is written on the work memory 68 so as to process the image data on the work memory 68. For example, when a decorative frame is selected, the decoration data of this frame is synthesized with the image data on the work memory 68, and the synthesized image data is transferred to the buffer memory 61.

Thereby, a still image with the decorative frame is displayed on the LCD unit 14. By operating the console 9, the image data processed on the work memory 68 may be written on the built-in memory 16, the card memory 15, or the external memory connected through the data I/O terminals 25.

When the printing mode is selected, the system controller 50 waits for a choice between a normal mode and an ID photo mode for making the ID photograph. If the normal mode is chosen, a still image to print is selected and displayed on the LCD unit 14 in the same way as for the selection of a still image to display in the display mode. If the operator wants to modify the selected still image, the processing command is entered, so the image data of the selected still image is processed in the same way as in the display mode. Thereafter, when a print command is entered, the system controller 50 proceeds to the following printing steps. Since the image selection steps of the printing sequence before the printing steps are identical to the display mode, it is possible to start the printing steps if a print command is entered at the end of the display mode.

In the printing steps, first the three color light emission diodes 35R, 35G and 35B are all turned off for a while, and the mirror switching solenoid 44 is turned on to move the finder mirror 43 from the monitoring position to the printing position. When the finder mirror 43 reaches the printing position, the display controller 60 starts driving the three color light emission diodes 35R, 35G and 35B through the LED driver 64 under the control of the system controller 50.

For the printing, the three color light emission diodes 35R, 35G and 35B are driven sequentially such that a total driving time of each light emission diode 35R, 35G or 35B coincides with an appropriate exposure time of the instant film 11 to light of each color, that is determined based on the film speed of the instant film 11 and optical characteristics of the printing optical system consisting of the mirror 41, the lens unit 42 and the printing mirror 45. In the same way as for the display mode, the display controller 60 drives the LCD panel 37 through the LCD driver 63 to display each color frame synchronously with the driving timing of each color light emission diode 35R, 35G or 35B. The three color light emission diodes 35R, 35G and 35B may be driven intermittently and repeatedly at regular intervals in the same way as in the display mode. In that case, the number of repetition is adjusted to the necessary exposure time. It is alternatively possible to drive each of the three color light emission diodes 35R, 35G and 35B continually for the necessary exposure time. Since the image of each color projected onto the instant film 11 is constituted of a large number of pixels corresponding to all of the liquid crystal dot segments of the LCD panel 39, the pixel density of the printed image is large enough even though the image on the LCD unit 14 is optically enlarged when projected onto the instant film 11.

When the exposure is concluded, the system controller 50 starts driving the developing motor 72 to eject and develop the instant film 11 in the way as set forth above.

After the instant film 11 is ejected, the mirror switching solenoid 44 is turned off to set the finder mirror 43 back to the monitoring position. Then, the display controller 60 drives the LCD panel 37 and the light emission diodes 35R, 35G and 35B in the same way as in the display mode, to display a full-color still image to print selected by operating the console 9.

Figure 8A:
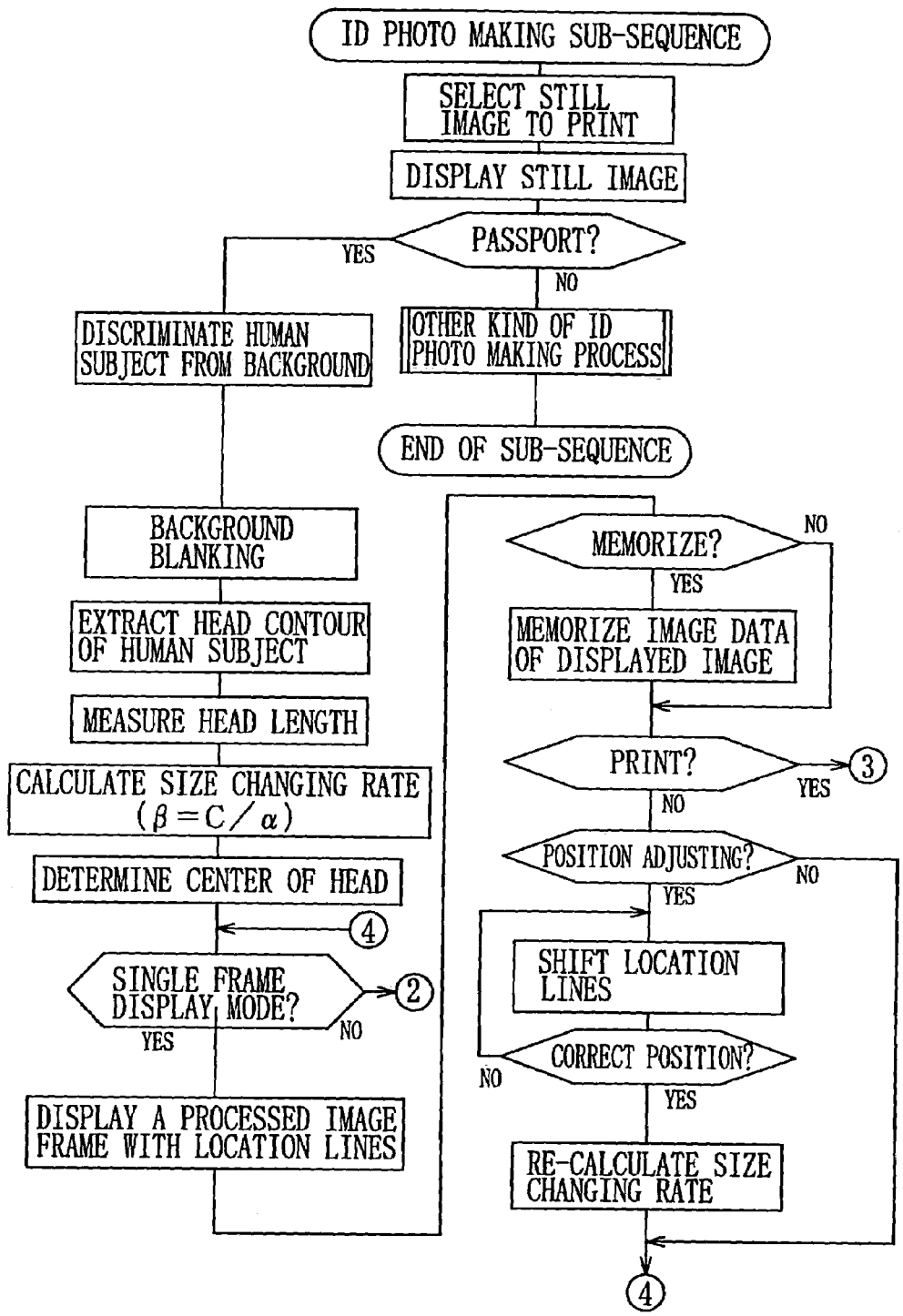
FIGS. 8A and 8B show a flow chart illustrating an ID photo making sub-sequence included in the printing sequence.
Figure 8B:
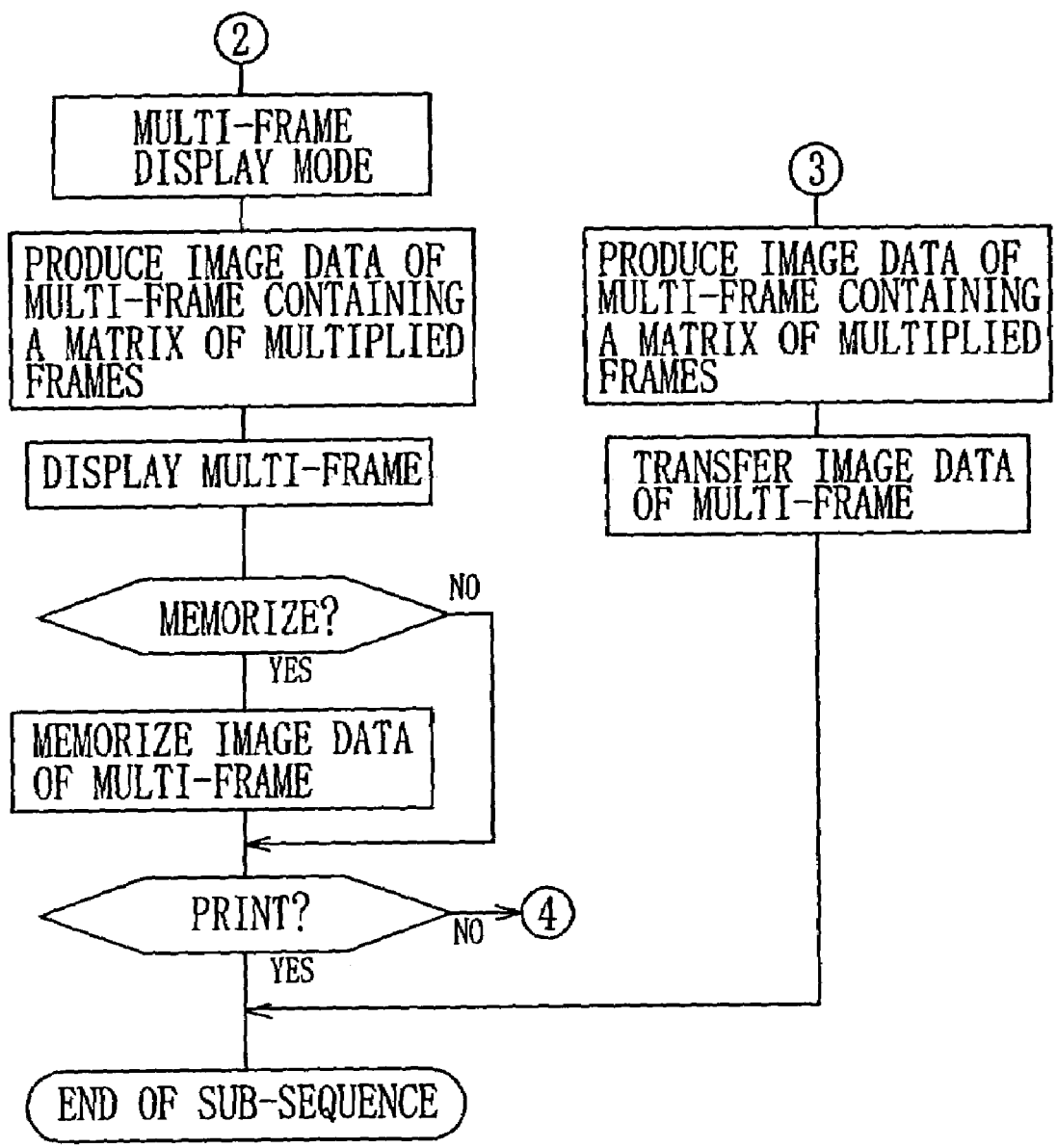

When the ID photo mode is selected, the system controller 50 executes an ID photo making subsequence as shown in FIGS. 8A and 8B. In the ID photo mode, the operator should select an image frame that is suitable for the ID photograph. That is, the image frame should contain a single full face human subject that does not wear a hut or colored glasses. Besides that conditions, the image frame must contain the whole head and the shoulder of the human subject for the passport, whereas it must contain the upper one third of the human subject for the driving license. The image frame for the ID photograph can contain some other objects in the background of the human subject, because those objects are deleted by a background blanking process afterward. However, an image frame having a simple or plane background would make it easier to discriminate the human subject from the background. It is also possible to skip the background blanking process when the background of the selected image frame is totally plane.

Figure 9:
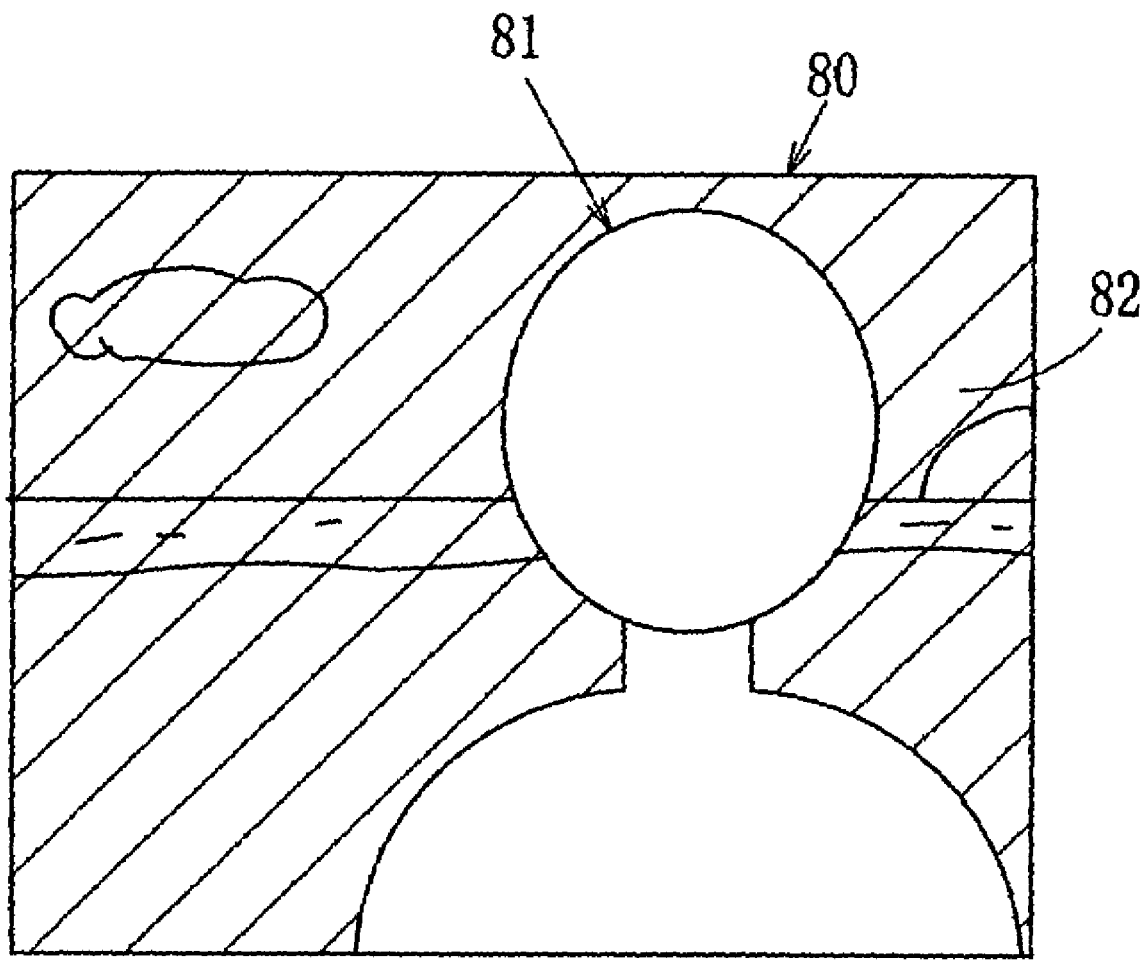
FIG. 9 is an explanatory diagram illustrating an image frame for selected for making an ID photograph.

As shown for example in FIG. 9, when an image frame 80 for making the ID photograph is selected, image data of the image frame 80 is written in the work memory 68. Thereafter, the operator designates the kind of ID photograph to make. It is possible to designate the kind of ID photograph before selecting the image frame 80.

If the passport is designated, the system controller 50 discriminates a human subject 81 from its background 82 on the basis of the image data written in the work memory 68, extracts image data pieces of the human subject 81, and then replaces other image data pieces that represent the background with predetermined blanking data, e.g. three color image data representative of a pale blue, as implied by hatching in FIG. 9. Thereafter, a contour of the whole head including the hair and the face is extracted from the image data pieces of the human subject.

Discrimination between the human subject and the background, as well as extraction of the head contour may be done by analyzing pixel density distributions or differences between image data values by use of a conventional contour extracting method as disclosed for example in JPA 8-122944 and JPA 9-138471.

The system controller 50 derives a head length α, i.e. the length from the crown to the chin, of the human subject as projected onto the instant film 11, from the head contour by calculation. Simultaneously, a vertical center line of the head extending from the crown and the chin of the head is determined based on the image data pieces included in the head contour. Since the number of liquid crystal dot segments of the LCD panel 37 corresponding to one pixel of image data, and the magnification rate of the image displayed on the LCD unit 14 to that projected onto the instant film 11 is predetermined, the head length a on the instant film 11 can be determined by the number of pixels located between the crown and the chin on the LCD panel 37.

After the head length α is detected, the system controller 50 calculates a size changing rate $\beta=C/\alpha$, wherein C represents the head length of the standardized passport photograph. By changing the size of the image frame presently displayed on the LCD unit 14 at this size changing rate β, the human subject of the image projected onto the instant film 11 is adjusted in size to the passport photograph standards. It is possible to calculate the size changing rate β based on the number of pixels located in a line from the crown to the chin of the head on the LCD panel 37 and the number of pixels corresponding to the standard head length C.

Thereafter, the system controller 50 determines a trimming range in correspondence with a frame range of one ID photograph such that the vertical center line of the head coincides with a vertical center line of the trimming range, and that the crown of the human subject is spaced by the length E from the top margin of the ID photograph.

Figure 10:
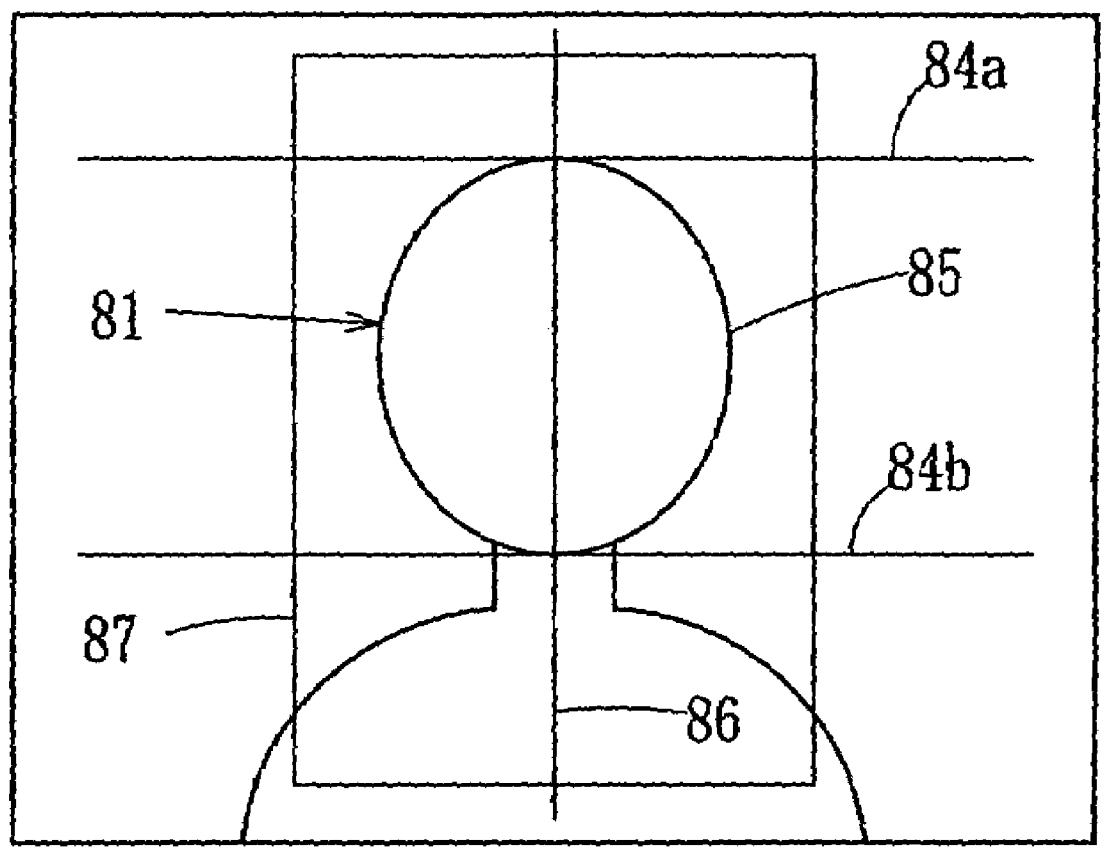
FIG. 10 is an explanatory diagram illustrating an image displayed on the LCD unit in a single-frame display mode.

After being processed in this way, the processed image frame is displayed either in a single frame display mode or in a multi-frame display mode according to a command entered through the console 9. In the single frame display mode, the whole image frame is displayed in a large size on the LCD unit 14 along with location lines 84a, 84b, 86 and 87, as shown in FIG. 10. The location lines 84a, 84b respectively indicate horizontal lines extending across the crown and the chin of the head 85 determined by the head contour extraction, whereas the location lines 86 and 87 respectively indicate the vertical center and boundary of the trimming range.

Figure 11:
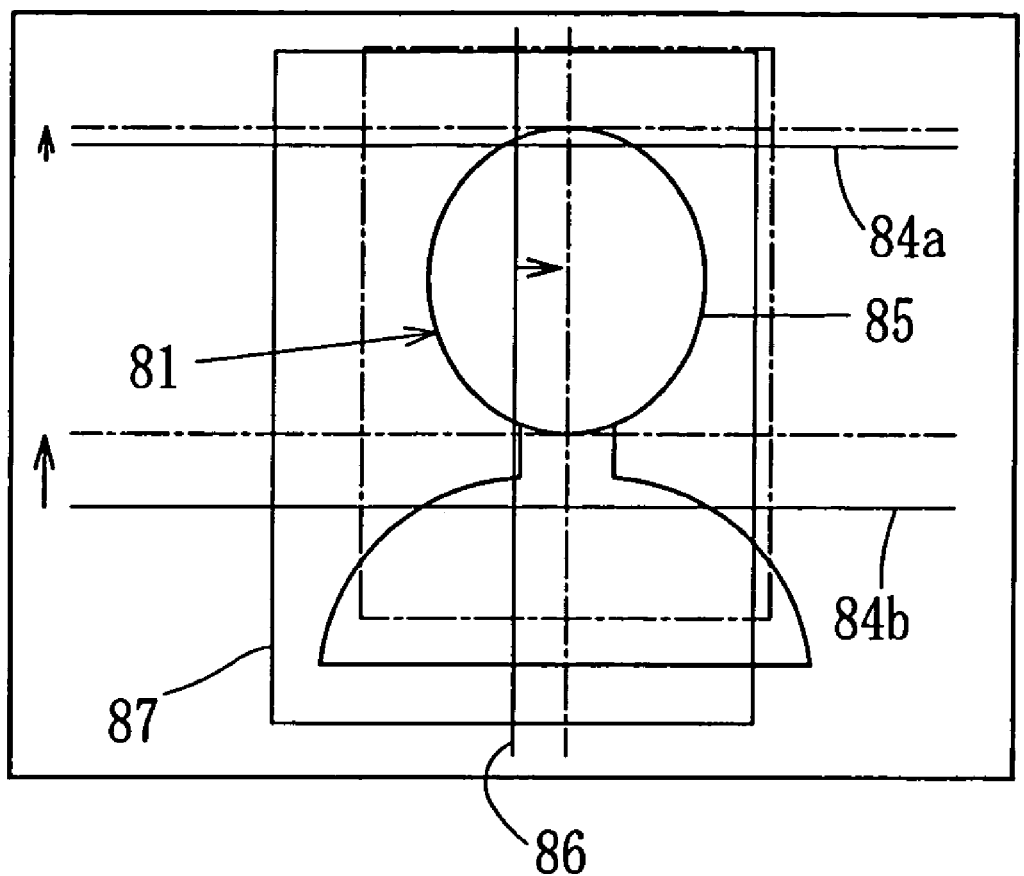
FIG. 11 is an explanatory diagram illustrating how to correct location lines on the image in the single-frame display mode.

If any of the location lines 84a, 84b, 86 and 87 deviates from its correct position with respect to the human subject, the operator designates the deviated location line by operating the setting buttons 9a, and corrects the position of the designated location line by operating the cursor key 9b. For example, if the location lines 84a, 84b, 86 and 87 are displayed in wrong positions as shown by solid lines in FIG. 11, the location lines 84a and 84b are shifted upward to put on the crown and the chin, and then the location line 86 is shifted to the vertical center of the head 85, as shown by phantom lines. The trimming range 87 is automatically relocated according to the length and the vertical center of the head 85 that are corrected by the relocation of the location lines 84a, 84b and 86.

At the conclusion of this position adjusting operation of the location lines, the system controller 50 recalculates a size changing rate β, and displays the image frame and the location lines 84a, 84b, 86 and 87 in a corrected size at corrected positions.

Figure 12:
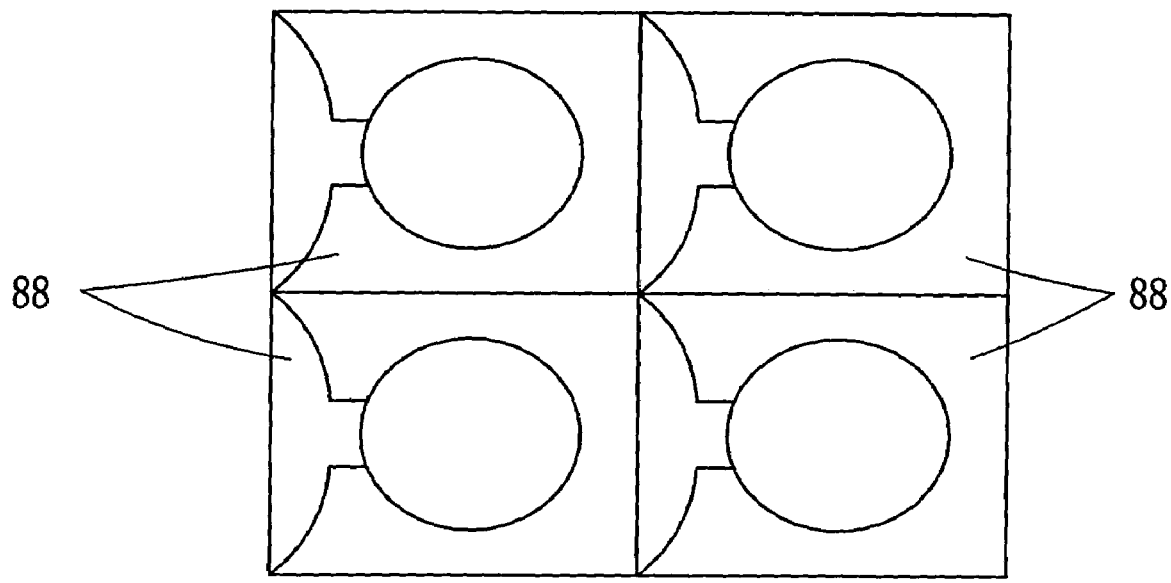
FIG. 12 is an explanatory diagram illustrating an image displayed on the LCD unit in a multi-frame display mode.

If the multi-frame display mode is selected, the system controller 50 process the image data written on the buffer memory 68 such that image data of an image portion bounded by the trimming range 87 is used to display multiplied frames on the LCD unit 14 in a 2×2 matrix arrangement, as shown in FIG. 12. The size of the human subject of the respective multiplied frames 88 is determined by the size changing rate β.

The image data processed for the ID photograph on the work memory 68 in the single frame display mode or the multi-frame display mode may be written in the card memory 15 or the built-in memory 16.

When the operator enters the printing command while the multiplied frames 88 are displayed on the LCD unit 14 in the multi-frame display mode, the same image as displayed on the LCD unit 14 is projected onto the instant film 11 at the predetermined magnification rate in the same way as described with respect to the normal mode. If the printing command is entered in the single frame display mode, the system controller 50 displays the multiplied frames 88 arranged in a 2×2 matrix, in the same way as in the multi-frame display mode, and then executes the same printing steps as the normal mode. In this way, four identical ID photographs standardized for passport are printed at once on the instant film 11.

If other kind of ID photograph is selected in the ID photo mode, the system controller 50 processes the image data of the selected image frame on the work memory 68 in the same way as for the passport, in accordance with the standards of the selected kind of ID photograph. For example, for the driving license, the upper one third of the human subject and a vertical center thereof are detected, and a trimming range and a size-changing rate are determined in accordance with the detected values, so that six identical ID photographs standardized for driving license and arranged in a 3×2 matrix are printed at once on the instant film 11.

Figure 13:
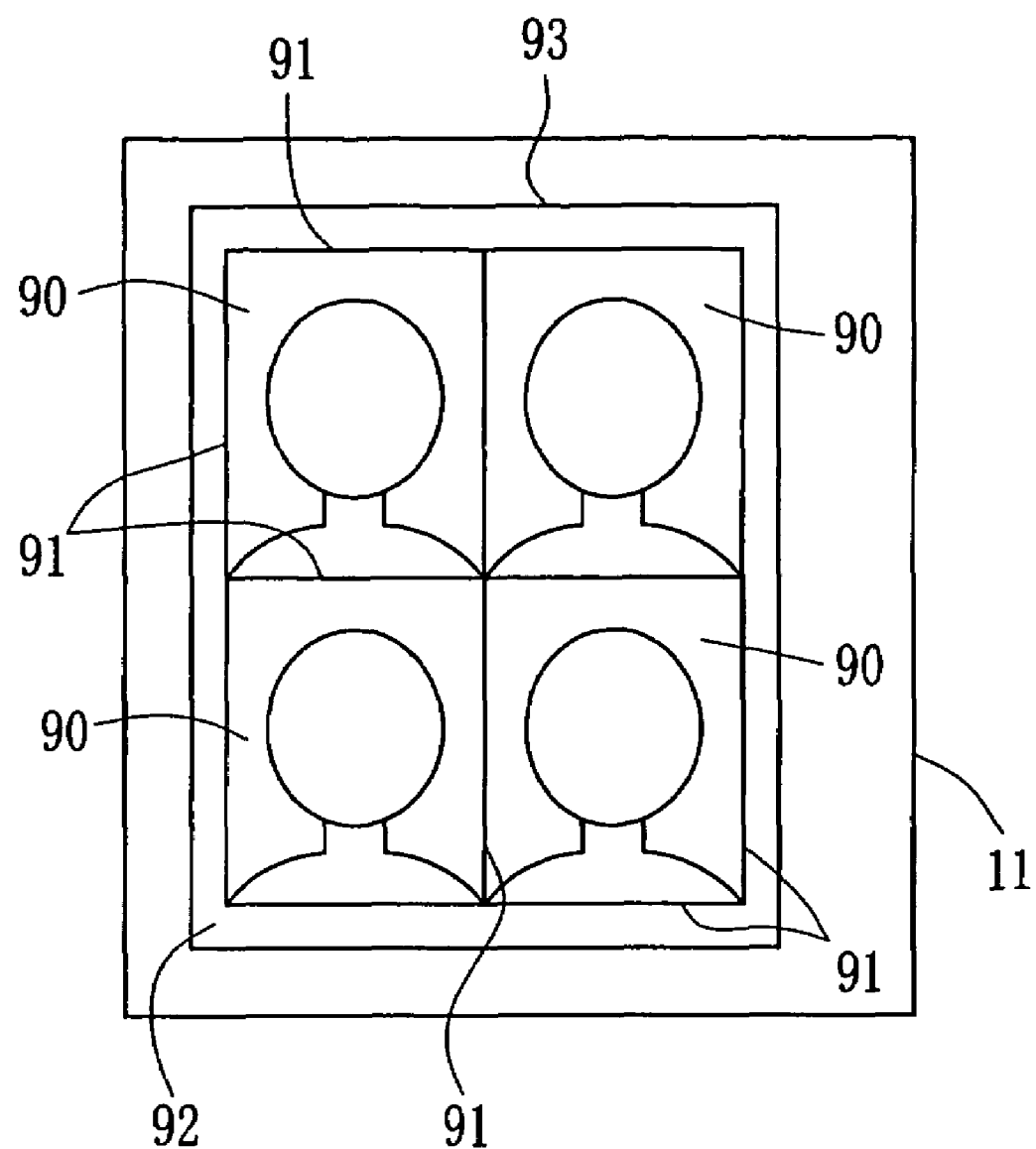
FIG. 13 is an explanatory diagram illustrating ID photographs printed on a sheet of instant film by the portable instant printer.
Figure 14:
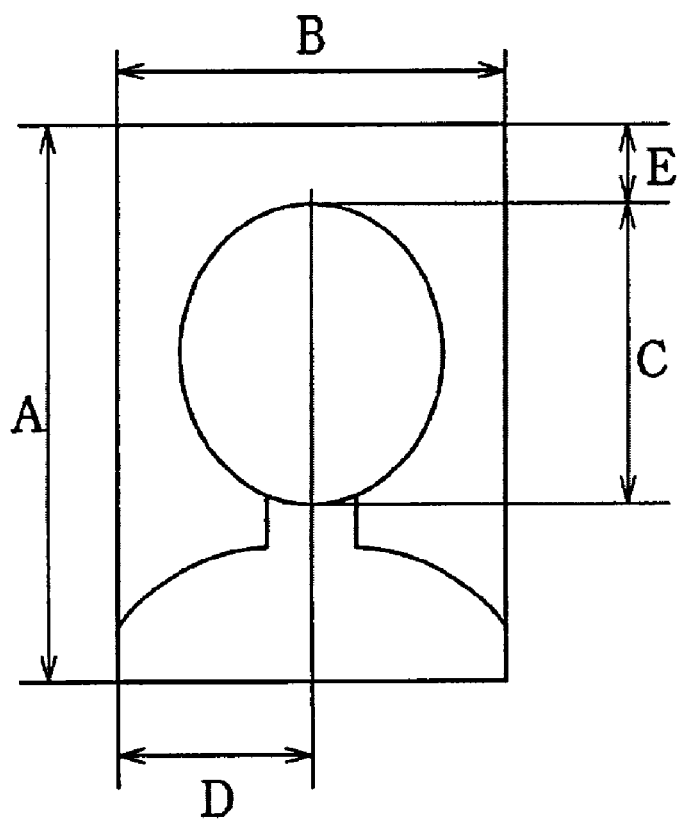
FIG. 14 is an explanatory diagram illustrating standards for the ID photograph for the passport.

It is possible to print cutting lines 91 for separating individual ID photographs 90 on the instant film 11 besides the ID photographs 90, as shown in FIG. 13. The cutting lines 91 correspond to the trimming range 87 displayed on the LCD unit 14 in the single-frame display mode. In FIG. 13, designated by 93 is the image exhibit area of the instant film 11. As shown by 92, the ID photographs 90 may not necessarily printed on the whole image exhibit area 93 of the instant film 11. The printing area of the ID photographs within the image exhibit area 93 of the instant film 11 may be determined according to the size and aspect ratio of each kind of ID photograph.

Since the cutting lines clearly show the trimming range or the boundary of each individual ID photograph, it is unnecessary to print each image frame in a standardized size insofar as the boundary and the human subject are adjusted in size and location to the standards of the designated kind of ID photograph.

As described so far, according to the present invention, any kind of standardized ID photograph may be produced from image data of an image photographed in ordinary situations, containing other subjects in the background of a main human subject, just by selecting the image and designating the kind of ID photograph to make.

Although the present invention has been described with respect to the portable instant printer 2 shown in the drawings, the present invention is applicable to a printer that does not have any electronic imaging device incorporated thereinto, or a printer to which an electronic imaging device, i.e. an electronic still camera, is removably attachable. The present invention is also applicable to an electronic still camera which does not have any printing device incorporated thereinto. In that case, image data may be processed for the ID photograph on that camera, and the processed image data may be written on a built-in memory of the camera or another data recording medium, such as a card memory. By connecting the camera to a printer, or setting the card memory in a printer, the printer can print out the ID photograph on the basis of the processed image data.

The kind of ID photograph that may be produced according to the present invention is not limited to those for the passport and the driving license, but many other kinds of ID photographs, such as those for curricula vitae, may be produced in the same way. It is possible to add a function that allows the operator to designate an appropriate print size for the ID photograph to make, and determines a trimming range of a selected image in correspondence with the designated print size. Thereby, it comes to be possible to make any kinds of ID photographs even if it is required to make a new kind of ID photograph whose size is different from any conventional ID photographs. The number and arrangement of the ID photographs printed at once on the instant film may preferably be automatically determined according to the size of each ID photograph to make and the image exhibit area of the instant film in combination. Thereby, it comes to be possible to make the ID photographs by use of different kinds of instant film sheets whose image exhibit areas are different in size. Moreover, it comes to be possible to print different kinds of ID photographs on the same instant film.

Although the image recorded on the instant film 11 appears on the opposite side of the exposure surface in the above embodiment, it is possible to use another kind of instant film wherein the recorded image appears on the same side as the exposure surface, or a so-called peel-apart type instant film wherein a negative sheet is peeled apart from a positive sheet. The present invention is applicable to those instant printers or digital instant cameras wherein a line recording head is used instead of the LCD unit 14 for exposing the instant film. The line recording head projects light beams onto the instant film along a main scan direction, while being moved relative to the instant film in a sub scan direction orthogonal to the main scan direction, to record image line by line.

The present invention is also applicable to a direct thermosensitive printer, a thermal transfer type printer, an ink-jet type printer, a xerography type printer or any other type of printer. Needless to say, the printer may be monochrome type in order to make black-and-white ID photographs.

Thus, the present invention is not to be limited to the above embodiments but, on the contrary, various modifications may be possible to those skilled in the art without departing from the scope of claims appended hereto.

What is claimed is:

1. A portable, handheld printer comprising:
   printing means for printing an image on a recording medium;
   driving means for driving the printing means based on digital image data;
   image processing means for extracting image data pieces representative of a human subject from image data of an image frame, and processing the image data pieces of the human subject such that the human subject is printed on the recording medium in a designated size at a designated position, the image processing device replacing image data pieces other than those of the human subject with blanking data to delete any other subject contained in the image frame, wherein the driving means drives the printing means in accordance with the image data processed by the image processing means, to print the human subject onto the recording medium in the designated size at the designated position with a blanked background;
   means for portably housing said printing means, said driving means and said image processing means;
   a mode selection device for selecting a normal mode for driving the printing means on the basis of the image data of the image frame to print a picture frame corresponding to the image frame, or a second mode for making an identification photograph for identifying a person by driving the printing means on the basis of the image data processed by the image processing means to print a picture frame containing the human subject with the blanked background; and
   a selection device for selecting a type of the identification photograph to make from among predetermined options, wherein the size and position of the human subject and a picture frame size are automatically designated by the selected type of identification photograph, and the size and position of the human subject and the picture frame size are stored in an internal memory.

2. A portable, handheld printer as claimed in claim 1, wherein the image processing means processes the image data of the image frame such that a picture frame containing the human subject with the blanked background is printed on the recording medium in a designated frame size.

3. A portable, handheld printer as claimed in claim 1, wherein the image processing means processes the image data of the image frame such that the human subject with the blanked background is printed on the recording medium together with a cutting line surrounding the human subject, the cutting line showing a boundary of a picture frame of a designated frame size.

4. A portable, handheld printer as claimed in claim 2 or 3, wherein the image processing means determines how many picture frames can be printed on the same recording medium depending upon the designated frame size and a recording area of the recording medium, and processes the image data of the image data such that picture frames of the determined number are printed on the same recording medium.

5. A portable, handheld printer as claimed in claim 1, wherein the recording medium is an instant film, and the printing means optically prints the image on the instant film.

6. A portable, handheld printer as claimed in claim 5, wherein the printing means comprises an LCD panel, three color light emission diodes for illuminating the LCD panel from its rear side, and a printing optical system for projecting an image displayed on the LCD panel toward the recording medium.

7. A portable, handheld printer as claimed in claim 6, further comprising a monitoring device for allowing to select and observe an image to print, wherein the image to print is displayed on the LCD panel and is observed through the monitoring device.

8. A portable, handheld printer as claimed in claim 1, wherein the printer may be loaded with a battery as a power source.

9. A portable, handheld printer as claimed in claim 1, further comprising an electronic imaging device for obtaining digital image data from a subject, and a memory for storing the image data by each frame.

* * * * *